United States Patent [19]
Yoon-Sik et al.

[11] Patent Number: 5,466,758
[45] Date of Patent: Nov. 14, 1995

[54] PROCESS FOR PREPARING POLYSTYRENES HAVING β HYDROXY GROUP AND POLYGLYCOL-GRAFTED POLYSTYRENES THEREOF

[76] Inventors: Lee Yoon-Sik, 10-104 Hyundai Apartment, Kwanyang-dong, Anyang-shi, Kyungki-do, 430-060; Park Byeong-Deog, 251-111 Shinlim 9-dong, Kwanak-ku, Seoul, 151-019; Lee Hyoung-Ik, 192-14, Upnae-ri, Dangjin-up, Dangjin-kun, Chungcheongnam-do, 343-800, all of Rep. of Korea

[21] Appl. No.: 226,942

[22] Filed: Apr. 13, 1994

[51] Int. Cl.[6] .................................................. C08F 8/00
[52] U.S. Cl. .................. 525/384; 525/332.2; 525/333.3; 525/385
[58] Field of Search .................................... 525/384, 385

[56] References Cited

U.S. PATENT DOCUMENTS

| | | | |
|---|---|---|---|
| 3,978,160 | 8/1926 | Seiler et al. | 525/333.3 |
| 4,908,405 | 3/1990 | Bayer et al. | |
| 5,247,026 | 9/1993 | Erickson et al. | 525/333.3 |

OTHER PUBLICATIONS

Warshawsky, A., et al., "Polymeric Pseudocrown Ethers. I. Synthesis and Complexation with Transition Metal Anions," *J. Amer. Chem. Soc.*, 101(15):4249–4258 (1979).

Farrall, M. J. and Fréchet, J. M. J., "Bromination and Lithiation: Two Important Steps in the Functionalization of Polystyrene Resins," *J. Org. Chem.*, 41(24):3877–3882 (1976).

Kiso, Y., et al., "Deprotection of O–Methyltyrosine by a 'Push–Pull' Using the Thioanisole–Trifluoromethanesulphonic Acid System. Application to the Convenient Syntheses of a Potent N–Methylenkephalin Derivative," *J.C.S. Chem. Comm.*, 971–972 (1979).

Letsinger, R. L., and Klaus, I., "Selective Catalysis Involving Reversible Association of a Synthetic Polymeric Catalyst and Substrate," *J. Am. Chem. Soc. Comm.*, 86:3884–3885 (1964).

*Primary Examiner*—Bernard Lipman
*Attorney, Agent, or Firm*—Arnall Golden & Gregory

[57] ABSTRACT

Processes for preparing polystyrene having a β hydroxy group and glycol grafted polystyrene thereof.

β hydroxy group is introduced onto polystyrene by reacting ethylene oxide or propylene oxide with the aromatic ring of the polystyrene in the presence of Lewis acid catalyst, the graft polystyrene being obtained by reacting ethylene oxide and/or propylene oxide with polystyrene having a β hydroxy group in the presence of base to result in a linkage that is stable in acidic medium.

11 Claims, No Drawings

PROCESS FOR PREPARING POLYSTYRENES HAVING β HYDROXY GROUP AND POLYGLYCOL-GRAFTED POLYSTYRENES THEREOF

BACKGROUND OF THE INVENTION

The present invention relates to processes for preparing polystyrene having β hydroxy group and polyglycol-grafted polystyrenes thereof. More specifically, the invention relates to processes for preparing polystyrene of the formula (I) having hydroxy group at β position in relation to aromatic ring,

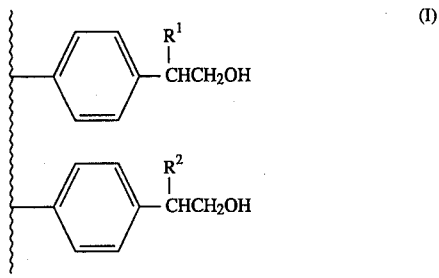

wherein $R^1$ and $R^2$ are the same or different H or $CH_3$; and process for preparing grafted polystyrene of the formula (II) by grafting polyglycols, such as polyethylene glycol, and polyethylenepropylene glycol, onto polystyrene having β hydroxy group,

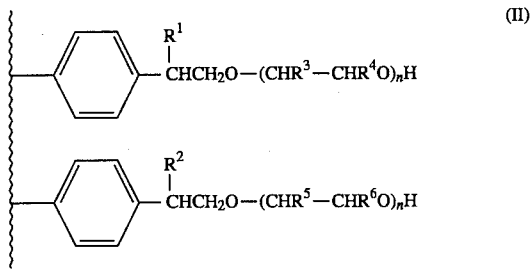

wherein $R^1$, $R^2$, $R^3$, $R^4$, $R^5$ and $R^6$ are the same or different H or $CH_3$.

Polystyrene grafted with polyethylene glycol is used in various organic reactions on account of the properties of high swelling and compatibility in various solvents, such as alcohol, dichloromethane, dimethylformamide, acetonitrile, and water; and amphoterism (W. M. Mckenzie, et al., *J. Chem. Soc. Chem.* 541–543 (1978); J. G. Heffernan, et al., *J. Chem. Soc. Perkin II* 514–517 (1981); Y. Kimura et al., *J. Org. Chem.* 48, 385–386 (1983); M. Tomoi, et al., *Reactive Polymers* 10, 27–36 (1989)).

Such polystyrenes grafted with polyethylene glycol have been prepared either by directly reacting chloromethylated polystyrene, generally known as Merrifield resin, with polyethylene glycol, as reported in Warshavsky, et al., *J. Am. Chem. Soc.* 101, 4249 (1970); or by introducing hydroxy group onto polystyrene and addition polymerization of ethylene oxide thereto.

One disadvantage of the direct reaction process resides in that cross-linking by polyethylene glycol occurs and makes it hard to obtain resin of desired properties.

Another disadvantage of the direct reaction process is that polystyrene is linked to polyethylene glycol through benzyl-ether linkages, which are unstable and cleaved to produce free polyethylene glycol in the presence of strong acid, such as trifluoroacetic acid, trifluoromethanesulfonic acid, and hydrofluoric acid, that are usually adopted in peptide synthesis, as reported in Y. Kiso, et al., *J. Chem., Soc. Chem. Comm.* 971 (1979).

In the other processes, conventionally Merrifield resin has been adopted to introduce hydroxy group onto polystyrene, in which hydroxy group is obtained as benzyl alcohol type by reacting Merrifield resin with dimethyl sulfide, as in *J. Am. Chem. Soc.* 86, 3884 (1964).

German Patent DE 3500180 AI (1986) to Bayer, et al., shows another process using direct reaction of Merrifield resin with tetraethylene glycols which are previously treated by bases, such as KOH, and NaOH.

But the processes using Merrifield resin to introduce hydroxy group have three drawbacks.

One drawback is that the process consists of two steps comprising Merrifield resin synthesis from polystyrene, and hydroxy group introduction.

Another drawback is that chloromethylether, a reactant in synthesizing Merrifield resin, is a known carcinogen.

The other drawback is that the resulting polystyrenes have hydroxy group at the α position in relation to aromatic ring, which result in benzyl-ether linkages between polystyrene and polyethylene glycol upon grafting.

A preferable process to overcome the above-mentioned drawbacks is to prepare polystyrene having hydroxy group at β position.

M. J. Farrall, et al., in *J. Org. Chem.* 41, 3877 (1976) discloses a process for introducing β hydroxy group, though the process consists of at least three steps.

Therefore, what is needed to avoid the drawbacks in the prior art is to efficiently introduce hydroxy group onto polystyrene without using a carcinogen, and to graft polyethylene glycol onto polystyrene through a bond which is stable to strong acid medium.

It is thus an object of the present invention to provide an efficient and safe route for preparing polystyrene having a hydroxy group.

It is another object of the present invention to provide polystyrene having hydroxy group at the β position in relation to the aromatic ring.

It is a further object of the present invention to provide polystyrene grafted with polyethylene glycol, or polyethylenepropylene glycol through bonds stable in strongly acidic environment.

SUMMARY OF THE INVENTION

The present invention provides polystyrene having a hydroxy group at β position in relation to aromatic ring. The hydroxy group is introduced onto the polystyrene by reacting ethylene oxide or propylene oxide with the aromatic ring of the polystyrene in the presence of Lewis acid catalyst.

The present invention also provides polystyrene grafted with polyethylene glycol, or polyethylenepropylene glycol through bonds stable in strongly acidic environment.

The grafted polystyrene is obtained by reacting ethylene oxide and/or propylene oxide with polystyrene having β hydroxy group in the presence of adequate amounts of base.

DETAILED DESCRIPTION OF THE INVENTION

Preparation of Polystyrene Having β Hydroxy Group

Introduction of β hydroxy group onto polystyrene according to the present invention is accomplished by reacting ethylene oxide or propylene oxide with polystyrene. The reaction is conducted in the presence of Lewis acid catalysts.

The present process includes steps of swelling polystyrene crosslinked with 1~12 weight % divinylbenzene in solvent, slow dropwise addition of ethylene oxide or propylene oxide dissolved in said solvent for 5–20 minutes, allowing sufficient reaction time for 5–10 hours. The reaction path is as follows,

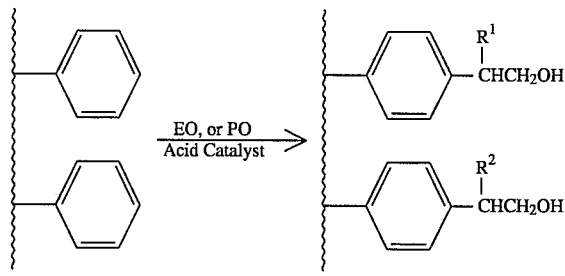

wherein $R^1$ and $R^2$ are different or same H or $CH_3$. Preferred solvents include $CCl_4$, dichloromethane, $CS_2$, nitroethane, preferred catalysts being Lewis acids, such as $AlCl_3$, $AlBr_3$, $SnCl_4$, $SnBr_4$, and $BF_3$, preferred reaction temperature being −10° C.~30° C.

The amounts of the introduced hydroxy group can be controlled by varying the amounts of employed catalysts and oxides, and is generally in a range from 0.01 mmol/g of resin to 2.5 mmol/g of resin.

The following examples are given as being exemplary of the present invention and accordingly should not be considered as limiting the scope of the present invention.

EXAMPLE 1

3 g of polystyrene crosslinked with 1 weight % divinylbenzene is swelled in 50 ml of dichloromethane. 3.2 g of $SnCl_4$ is introduced and dissolved. 1.5 ml of ethylene oxide is diluted in 10 ml of dichloromethane and slowly added dropwise. The mixture is stirred at −10° C. for 5 hours to complete the reaction, washed with dichloromethane, then dried in a vacuum oven. C.H.N. elementary analysis of the resulting material shows 0.102 mmol of hydroxy group/g of resin.

EXAMPLE 2

3 g of polystyrene crosslinked with 1 weight % divinylbenzene is swelled in 50 ml of dichloromethane. 3.5 g of $SnCl_4$ is introduced and dissolved. 1.5 ml of ethylene oxide is diluted in 10 ml of dichloromethane and slowly added dropwise. The mixture is stirred at −10° C. for 5 hours to complete the reaction, washed with dichloromethane, then dried in a vacuum oven. C.H.N elementary analysis of the resulting material shows 0.101 mmol of hydroxy group/g of resin.

EXAMPLE 3

3 g of polystyrene crosslinked with 1 weight % divinylbenzene is swelled in 50 ml of $CCl_4$. 2.0 g of $AlCl_3$ is introduced and dissolved. 1.5 ml of ethylene oxide is diluted in 10 ml of dichloromethane and slowly added dropwise. The mixture is stirred at −10° C. for 5 hours to complete the reaction, washed with dichloromethane, then dried in a vacuum oven. C.H.N. elementary analysis of the resulting material shows 0.008 mmol of hydroxy group/g of resin.

EXAMPLE 4

3g of polystyrene crosslinked with 1 weight % divinylbenzene is swelled in 50 ml of $CCl_4$. 2.0 g of $AlBr_3$ is introduced and dissolved. 1.5 ml of ethylene oxide is diluted in 10 ml of dichloromethane and slowly added dropwise. The mixture is stirred at 0° C. for 5 hours to complete the reaction, washed with dichloromethane, then dried in a vacuum oven. C.H.N elementary analysis of resulting material shows 0.006 mmol of hydroxy group/g of resin.

EXAMPLE 5

3 g of polystyrene crosslinked with 1 weight % divinylbenzene is swelled in 50 ml of $CCl_4$. 1.0 g of $BF_3$ is introduced and dissolved. 1.5 ml of ethylene oxide is diluted in 10 ml of dichloromethane and slowly added dropwise. The mixture is stirred at 0° C. for 5 hours to complete the reaction, washed with dichloromethane, then dried in a vacuum oven. C.H.N elementary analysis of the resulting material shows 0.005 mmol of hydroxy group/g of resin.

EXAMPLE 6

3 g of polystyrene crosslinked with 1 weight % divinylbenzene is swelled in 50 ml of dichloromethane. 3.2 g of $SnCl_4$ is introduced and dissolved. 1.5 ml of propylene oxide is diluted in 10 ml of dichloromethane and slowly added dropwise. The mixture is stirred at 0° C. for 5 hours to complete the reaction, washed with dichloromethane, then dried in a vacuum oven. C.H.N elementary analysis of the resulting material shows 2.4 mmol of hydroxy group/g of resin.

EXAMPLE 7

3 g of polystyrene crosslinked with 1 weight % divinylbenzene is swelled in 50 ml of $CCl_4$. 3.5 g of $SnBr_4$ is introduced and dissolved. 1.5 ml of propylene oxide is diluted in 10 ml of dichloromethane and slowly added dropwise. The mixture is stirred at 10° C. for 5 hours to complete the reaction, washed with dichloromethane, then dried in a vacuum oven. C.H.N elementary analysis of the resulting material shows 2.0 mmol of hydroxy group/g of resin.

EXAMPLE 8

3 g of polystyrene crosslinked with 1 weight % divinylbenzene is swelled in 50 ml of $CCl_4$. 2.0 g of $AlCl_3$ is introduced and dissolved. 1.5 ml of propylene oxide is diluted in 10ml of dichloromethane and slowly added dropwise. The mixture is stirred at 10° C. for 5 hours to complete the reaction, washed with dichloromethane, then dried in a vacuum oven. C.H.N elementary analysis of the resulting material shows 0.620 mmol hydroxy of group/g of resin.

EXAMPLE 9

3 g of polystyrene crosslinked with 1 weight % divinylbenzene is swelled in 50 ml of $CCl_4$. 2.0 g of $AlBr_3$ is introduced and dissolved. 1.5 ml of propylene oxide is diluted in 10 ml of dichloromethane and slowly added dropwise. The mixture is stirred at 0° C. for 5 hours to complete the reaction, washed with dichloromethane, then dried in a vacuum oven. C.H.N elementary analysis of the resulting material shows 0.250 mmol of hydroxy group/g of resin.

EXAMPLE 10

3 g of polystyrene crosslinked with 1 weight % divinylbenzene is swelled in 50 ml of $CCl_4$. 1.0 g of $BF_3$ is introduced and dissolved. 1.5 ml of propylene oxide is diluted in 10 ml of dichloromethane and slowly added dropwise. The mixture is stirred at 0° C. for 5 hours to complete the reaction, washed with dichloromethane, then dried in a vacuum oven. C.H.N elementary analysis of the resulting material shows 0.110 mmol of hydroxy group/g of resin.

The data of the above Examples 1 to 10 are summarized in Table 1.

TABLE 1

| Example No. | PS (g) | Catalyst (g) | | Oxide (ml) | | Concentration of OH (mmol/g of resin) |
| --- | --- | --- | --- | --- | --- | --- |
| 1. | 3 | $SnCl_4$ | 3.2 | EO | 1.5 | 0.102 |
| 2. | 3 | $SnCl_4$ | 3.5 | EO | 1.5 | 0.101 |
| 3. | 3 | $AlCl_3$ | 2.0 | EO | 1.5 | 0.008 |
| 4. | 3 | $AlBr_3$ | 2.0 | EO | 1.5 | 0.006 |
| 5. | 3 | $BF_3$ | 1.0 | EO | 1.5 | 0.005 |
| 6. | 3 | $SnCl_4$ | 3.2 | PO | 1.5 | 2.400 |
| 7. | 3 | $SnBr_4$ | 3.5 | PO | 1.5 | 2.000 |
| 8. | 3 | $AlCl_3$ | 2.0 | PO | 1.5 | 0.620 |
| 9. | 3 | $AlBr_3$ | 2.0 | PO | 1.5 | 0.250 |
| 10. | 3 | $BF_3$ | 1.0 | PO | 1.5 | 0.110 |

Table 1 shows that propylene oxide introduces more hydroxy group onto polystyrene than ethylene oxide does when the same amount of oxides are employed with the same catalyst.

EXAMPLE 11–15

The procedure described in Example 1 was repeated with varying amounts of $SnCl_4$ and propylene oxide instead of ethylene oxide with reaction temperature of 40° C. The results are provided in Table 2.

TABLE 2

| Example No. | PS (g) | Catalyst (g) | Oxide (ml) | Concentration of OH (mmol/g of resin) |
| --- | --- | --- | --- | --- |
| 11. | 3 | 1.5 | 0.7 | 1.07 |
| 12. | 3 | 3.2 | 1.5 | 1.12 |
| 13. | 3 | 4.6 | 4.6 | 1.27 |
| 14. | 3 | 8.3 | 8.3 | 1.41 |
| 15. | 3 | 15.0 | 15.0 | 1.88 |

Table 2 shows that the concentration of the introduced hydroxy group increases as the amounts of added catalyst and propylene oxide increase.

Preparation of Grafted Polystyrene

Preparation of grafted polystyrene according to the present invention includes steps of swelling polystyrene having a β-hydroxy group in solvent; such as tetrahydrofuran, dioxane, adding base to promote the reaction, adding ethylene oxide and/or propylene oxide; allowing reaction at 80°–120° C. for 4~10 hours; washing with water and methanol; and drying. The reaction path is as follows:

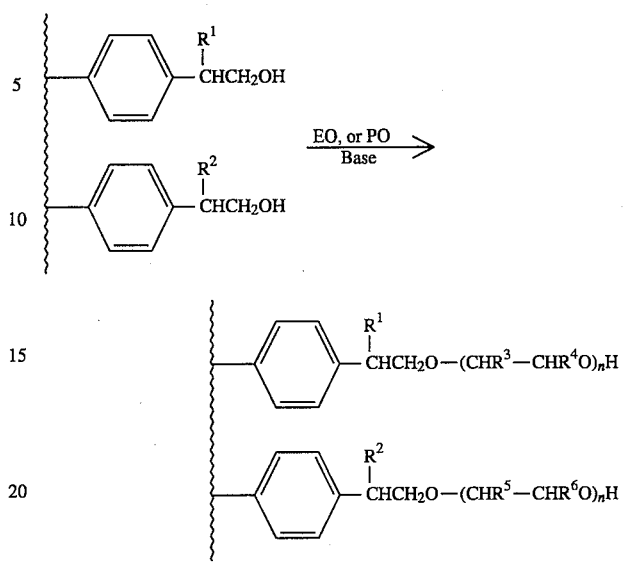

wherein $R^1$, $R^2$, $R^3$, $R^4$, $R^5$ and $R^6$ are the same or different H or $CH_3$. The molecular weight of the resulting polystyrene grafted with polyethylene glycol, or polyethylenepropylene glycol ranges from 300 to 3000.

The preferred bases are NaOH, KOH, KH, Na/Naphthalenide.

Volume ratio of ethylene oxide to propylene oxide in the mixture is preferably in a range from 1:99 to 6:4, more preferably from 2:8 to 4:6.

EXAMPLE 16

1 g of 2-(1-methyl) hydroxyethyl polystyrene (PS-PO) obtained in accordance with Example 11 is swelled in 30 ml of dioxane. 1.5 equivalents of KH is added and stirred. Then 5.24 ml of ethylene oxide is added. The mixture is stirred at 105° C. for 9 hours to complete the reaction, washed with distilled $H_2O$ and methanol, and dried in a vacuum oven. The amounts of the hydroxy group and degree of graft in the resulting grafted polystyrenes are shown in Table 3.

EXAMPLE 17

A reaction employing KOH instead of KH, otherwise identical to Example 16, is carried out. The result is shown in Table 3.

EXAMPLE 18

A reaction employing NaOH instead of KH, otherwise identical to Example 16, is carried out. The result is shown in Table 3.

EXAMPLE 19

1 g of 2-(1-methyl) hydroxyethyl polystyrene (PS-PO) obtained in accordance with Example 11 is swelled in 30 ml of dioxane. 1.5 equivalents of Na/Naphthalenide is added and stirred. Then 2.99 ml of ethylene oxide is added. The mixture is stirred at 100° C. for 9 hours to complete the reaction, washed with distilled $H_2O$ and methanol and dried in a vacuum oven. The amounts of the hydroxy group and degree of graft in the resulting grafted polystyrene are shown in Table 3.

EXAMPLE 20

1 g of 2-(1-methyl) hydroxyethyl polystyrene (PS-PO) obtained in accordance with Example 11 is swelled in 30 ml of tetrahydrofuran (THF). 1.5 equivalents of KOH is added and stirred. Then 5.95 ml of ethylene oxide is added. The mixture is stirred at 80° C. for 4 hours to complete the reaction, washed with distilled $H_2O$ and methanol and dried in a vacuum oven. The amounts of the hydroxy group and degree of graft in the resulting grafted polystyrene are shown in Table 3.

EXAMPLE 21

1 g of 2-(1-methyl) hydroxyethyl polystyrene (PS-PO) obtained in accordance with Example 11 is swelled in 30 ml of THF. 1.1 equivalents of Na/Naphthalenide is added and stirred. Then 2.99 ml of ethylene oxide is added. The mixture is stirred at 80° C. for 5 hours to complete the reaction, washed with distilled $H_2O$ and methanol and dried in vacuum oven. The amounts of the hydroxy group and degree of graft in the resulting grafted polystyrene are shown in Table 3.

EXAMPLE 22

1 g of 2-(1-methyl) hydroxyethyl polystyrene (PS-PO) obtained in accordance with Example 11 is swelled in 30 ml of dioxane. 1.5 equivalents of KOH is added and stirred. Then 2.99 ml of ethylene oxide is added. The mixture is stirred at 105° C. for 9 hours to complete the reaction, washed with distilled $H_2O$ and methanol and dried in a vacuum oven. The amounts of the hydroxy group and degree of graft in the resulting grafted polystyrene are shown in Table 3.

The results of Example 22 are summarized in Table 3.

TABLE 3

| Example No. | Solvent | Base (Equivalent) | Oxide (ml) | Reaction time (hr) | Amount of Grafted PEG (g/g of resin) | OH in grafted PS (mmol/g of resin) |
| --- | --- | --- | --- | --- | --- | --- |
| 16 | Dioxane | KH 1.5 | 5.24 | 9 | 0.10 | 0.97 |
| 17 |  | KOH 1.5 | 5.24 | 9 | 1.07 | 0.52 |
| 18 |  | NAOH 1.5 | 5.24 | 9 | 1.07 | 0.53 |
| 19 |  | Na/Naph 1.1 | 2.99 | 9 | 1.47 | 0.43 |
| 20 | THF | KOH 1.5 | 5.95 | 4 | 0.50 | 0.71 |
| 21 |  | Na/Naph 1.1 | 2.99 | 5 | 1.30 | 0.47 |
| 22 | DMF | KOH 1.5 | 2.99 | 9 | 0.38 | 0.78 |

EXAMPLE 23–29

The procedure described in Example 16 was repeated with varying amounts of oxide. The results are provided in Table 4.

TABLE 4

| Example No. | Oxide (ml) | Average M.W of polyglycol in grafted polymer | OH in grafted PS (mmol/g of resin) |
|---|---|---|---|
| 23 | EO 4.70 | 610 | 0.71 |
| 24 | EO 5.25 | 840 | 0.61 |
| 25 | EO 5.95 | 950 | 0.57 |
| 26 | EO 7.09 | 1170 | 0.48 |
| 27 | EO 7.94 | 1210 | 0.41 |
| 28 | EO 15.50 | 2300 | 0.21 |
| 29 | PO + EO(20:80, v/v) 7.30 | 650 | 0.85 |

To compare the stability of the grafted polystyrene according to the present invention with conventional grafted polystyrene from Merrifield resin in acid medium, each resin is introduced in 50% trifluoroacetic acid (TFA)/dichloromethane (MC) and trifluoromethanesulfonic acid (TFMSA)/MC.

As time passes, fractions of the polymers are removed and applied to C.H.N elementary analysis to calculate the carbon value. The results are shown in Table 5 and Table 6.

TABLE 5

The results of Stability Test of Ps-g-PEG resin in 50% Trifluoroacetic acid/MC*.

| Resin | Time (Min) | CHN Analysis | | | PEG fraction (%)$^b$ |
|---|---|---|---|---|---|
| | | C % | H % | N % | |
| PS-g-PEG-1 | 0 | 66.01 | 9.05 | ● | 69.6 |
| PS-g-PEG-1 | 11 | 66.04 | 8.49 | ● | 69.4 |
| PS-g-PEG-1 | 36 | 66.29 | 9.24 | ● | 68.8 |
| PS-g-PEG-1 | 81 | 70.18 | 9.13 | ● | 58.5 |
| PS-g-PEG-1 | 118 | 70.85 | 9.35 | ● | 56.7 |
| PS-g-PEG-2 | 0 | 62.38 | 9.90 | ● | 79.1 |
| PS-g-PEG-2 | 15 | 62.38 | 9.71 | ● | 79.1 |
| PS-g-PEG-2 | 41 | 61.54 | 9.99 | ● | 81.4 |
| PS-g-PEG-2 | 87 | 61.31 | 9.81 | ● | 81.9 |
| PS-g-PEG-2 | 131 | 61.88 | 9.51 | ● | 80.5 |

*Condition; Reaction Temperature; 25° C.?
PS-g-PEG-1; Polystyrene grafted with polyethylene glycol in conventional method
PS-g-PEG-2; Polystyrene grafted with polyethylene glycol according to the present invention

TABLE

Stability of PS-G-PEG Resin in Trifluoromethanesulfonic acid/MC*.

| Resin | Time (Min) | CHN Analysis | | | PEG fraction (%)$^b$ |
|---|---|---|---|---|---|
| | | C % | H % | N % | |
| PS-g-PEG-1 | 0 | 66.01 | 9.48 | ● | 69.6 |
| PS-g-PEG-1 | 18 | 75.82 | 7.78 | ● | 43.5 |
| PS-g-PEG-1 | 27 | 77.97 | 7.33 | ● | 37.8 |
| PS-g-PEG-1 | 51 | 77.29 | 7.46 | ● | 39.6 |
| PS-g-PEG-1 | 118 | 70.85 | 9.35 | ● | 56.7 |
| PS-g-PEG-2 | 0 | 62.38 | 9.90 | ● | 79.1 |
| PS-g-PEG-2 | 24 | 61.86 | 9.67 | ● | 80.5 |
| PS-g-PEG-2 | 32 | 62.20 | 9.84 | ● | 79.6 |
| PS-g-PEG-2 | 62 | 62.61 | 9.84 | ● | 78.5 |
| PS-g-PEG-2 | 75 | 62.93 | 9.97 | ● | 77.7 |

*Condition; Reaction Temperature; 25° C. [Methylthiophenol] = $2.5 \times 10^{-1}$ mol/l, [TFMSA] = $3.0 \times 10^{-1}$N
PS-g-PEG-1; Polystyrene grafted with polyethylene glycol in conventional method
PS-g-PEG-2; Polystyrene grafted with polyethylene glycol according to the present invention As seen in Table 5 and Table 6, as time passes the carbon value varies little in PS-g-PEG-2, on the other hand, said value increases in PS-g-PEG-1 indicating loss of PEG by the cleavage of the benzylether bond.

Therefore, the method according to the present invention has the following advantages.

Firstly, polystyrene with a β hydroxy group can be prepared through a simple and economical route.

Secondly, the amount of a β hydroxy group introduced onto polystyrene can be easily regulated by varying amounts of added catalyst and oxides.

Thirdly, polyglycols can be grafted onto polystyrene through a linkage which is stable in a strong acid medium.

We claim:

1. A process for preparing polystyrene having a hydroxy group at a β position in relation to aromatic ring, which comprises the steps of (a) swelling polystyrene crosslinked with divinylbenzene in solvent, (b) adding Lewis acid catalyst, and (c) adding ethylene oxide and/or propylene oxide to the mixture.

2. The process of claim 1, wherein the catalyst is selected from the group consisting of $AlCl_3$, $SnCl_4$, $SnBr_4$, and $BF_3$.

3. The process of claim 1, wherein the solvent is selected from the group consisting of dichloromethane, $CCl_4$ dichloroethane, $CS_2$, and nitromethane.

4. A process for preparing polystyrene grafted with polyglycols, which comprises (a) preparing polystyrene having a β hydroxy group, which comprises the steps of (i) swelling polystyrene crosslinked with divinylbenzene in solvent, (ii) adding Lewis acid catalyst, and (iii) adding ethylene oxide and/or propylene oxide to the mixture, (b) swelling polystyrene having a β hydroxy group in dioxane or tetrahydrofuran, (c) adding a reaction-promoting base, and (d) adding ethylene oxide and/or propylene oxide dissolved in dioxane or tetrahydrofuran.

5. The process of claim 4, wherein the base is selected from the group consisting of NaOH, KOH, KH, and Na/Naphthalenide.

6. The process of claim 4, wherein the polyglycols are polyethylene glycols having an average molecular weight of between 500 and 3000, and the concentration of the hydroxy group on the grafted polymer is in a range of between 0.005 mmol/g and 0.7 mmol/g of resin.

7. The process of claim 4, wherein the polyglycols are polyethylene-polypropylene glycols having an average molecular weight of between 100 and 2000, and the concentration of the hydroxy group on the grafted polymer is in a range of between 0.0006 mmol/g and 0.9 mmol/g of resin.

8. The process of claim 4, wherein the volume ratio of ethylene oxide to propylene oxide is in a range of between 1:99 and 6:4.

9. The process of claim 5, wherein the polyglycols are polyethylene glycols having an average molecular weight of between 500 and 3000, and the concentration of the hydroxy group on the grafted polymer is in a range of between 0.005 mmol/g and 0.7 mmol/g of resin.

10. The process of claim 5, wherein the polyglycols are polyethylene-polypropylene glycols having an average molecular weight of between 100 and 2000, and the concentration of the hydroxy group on the grafted polymer is in a range of between 0.0006 mmol/g and 0.9 mmol/g of resin.

11. The process of claim 5, wherein the volume ratio of ethylene oxide to propylene oxide is in a range of between 1:99 and 6:4.

* * * * *